United States Patent [19]

Barnett

[11] Patent Number: 5,597,787
[45] Date of Patent: Jan. 28, 1997

[54] LEAD PAINT REMOVAL

[76] Inventor: Irvin Barnett, P.O. Box 27209, San Diego, Calif. 92198-1209

[21] Appl. No.: 151,952

[22] Filed: Nov. 15, 1993

[51] Int. Cl.$^6$ .............................. C09D 9/00; C11D 7/06; C11D 7/50; C11D 7/60
[52] U.S. Cl. .................. 510/203; 510/207; 510/212; 510/434; 510/435; 510/476; 510/506; 510/507
[58] Field of Search .................. 252/DIG. 8, 170, 252/171, 174.25, 174.24, 174.23, 156, 158, 159, DIG. 2, DIG. 14

[56] References Cited

U.S. PATENT DOCUMENTS

| | | | |
|---|---|---|---|
| 1,581,413 | 4/1926 | Yoakam | 252/DIG. 8 |
| 2,447,052 | 8/1948 | Bond et al. | 252/DIG. 8 |
| 3,324,039 | 6/1967 | Rosenfeld | 252/153 |
| 4,125,476 | 11/1978 | Dean | 252/DIG. 8 |
| 4,285,827 | 8/1981 | Wyatt | 252/DIG. 8 |
| 4,353,745 | 10/1982 | Ebbeler | 252/171 |
| 4,426,250 | 1/1984 | Brailsford | 252/156 |
| 4,643,840 | 2/1987 | Brocklehurst et al. | 252/DIG. 8 |
| 4,699,730 | 10/1987 | Miles et al. | 252/DIG. 8 |
| 5,015,410 | 5/1991 | Sullivan | 252/162 |
| 5,098,591 | 3/1992 | Stevens | 252/DIG. 8 |
| 5,124,062 | 6/1992 | Stevens | 252/162 |
| 5,167,853 | 12/1992 | Stevens | 252/DIG. 8 |
| 5,188,675 | 2/1993 | Dormon-Brailsford | 252/DIG. 8 |
| 5,288,335 | 2/1994 | Stevens | 252/DIG. 8 |
| 5,334,256 | 8/1994 | Howe | 134/38 |

OTHER PUBLICATIONS

"Lead is a Four–Letter Word The Tragedy of Lead–based Paint", Irvin Barnett, Envirobestos Research, May 1994.
Chemical Abstract accession No. 110:77728, for JP 63221179, Sep. 14, 1988.
Derwent Abstract accession No. 88–302743, for JP 63221179, Sep. 14, 1988.

*Primary Examiner*—Ardith Hertzog
*Attorney, Agent, or Firm*—Ernest D. Buff

[57] ABSTRACT

Oil based paint containing lead compounds is removed from a substrate on which it is deposited by application of an aqueous solution thereto. The solution comprises a solvent that does not dissolve the paint and is compatible with water; a film former for retarding evaporation; a viscosity builder to fortify the solution and prevent slumping thereof during application to vertical and overhead horizontal surfaces; an alkaline compound for reacting with the pigment portion of the paint. Advantageously, the solution penetrates the deposited paint, which coagulates and separates from the substrate. Stripping procedures are facilitated, and neutralization of the substrate prior to repainting is avoided. A safe and effective treatment of materials covered with lead-containing paint is carried out in an economical, cost efficient manner.

2 Claims, No Drawings

LEAD PAINT REMOVAL

BACKGROUND OF THE INVENTION

1. Field of the Invention

This invention relates to the treatment of materials that have been painted with lead-based paint to effect the removal of the paint in a safe and economical manner.

2. Description of the Prior Art

It has been established that paint containing lead compounds presents a health hazard, and its use in the United States has been banned since about 1978. Nevertheless much untreated lead paint is still in place; its removal is highly advisable and, in many installations, mandated by law. The reason for requiring removal of paint containing lead is that continued aging thereof causes it to flake and dust, increasing the potential for lead poisoning from inhalation.

There are presently available two methods for removing or stripping paint. One is physical and the other chemical. The physical method involves either sand-blasting or destruction of the paint using heat from a blow-torch or hot air blower having an output temperature up to 1200° F. This method is expected to be banned by the EPA shortly.

The chemical method involves two distinct classes of products and procedures. The most common products are those that contain an assortment of organic solvents, such as methylene chloride, toluene, acetone and various alcohols, that soften and/or dissolve whatever paint vehicle is encountered. Such products have been marketed for years. A number of these solvents are believed to be hazardous, having exhibited toxic and carcinogenic effects. Many of them have technical and economical disadvantages. The high volatility of these solvents severely restricts the time period allotted for removal of softened or dissolved paint, which rehardens shortly after application of the remover. Costs involved in removal and disposal of the tacky material produced by the solvents is relatively high. Solvent-type removers are restricted by seasonal and geographical conditions. Application of such removers outdoors in hot weather (above about 85° F.), or in direct sunlight has been unsuccessful. Even though these products are said to include a film-former, the temperature of the painted substrate cannot exceed 100° F. Above that temperature, the majority of solvent volatilizes prior to film formation, rendering the product ineffective.

A recently introduced line of products for chemically removing paint contain no organic solvents. These products are comprised principally of a combination of caustic compounds, such as calcium hydroxide, magnesium hydroxide, and sodium hydroxide. Such compounds are in a water base and generally form a paste. These products are applied to the painted material, and then allowed to dry for time periods as high as 48 hours. It is recommended by products of this type that the applied coating be covered with a polyethylene sheeting to retard drying and increase activity time. After drying is completed, a crusty residue, formed during drying, is scraped off laboriously. Thereafter, the substrate must be neutralized with an acid using precautionary procedures to prevent run-off from entering ground waters.

SUMMARY OF THE INVENTION

The present invention provides a method whereby materials covered with oil-based paint, especially paint containing lead compounds, are treated with an aqueous solution to effect the removal of the paint. In addition, the invention provides a composition for use with such method to effect removal of oil based paint in a safe, economical manner.

Specifically, the present invention provides an aqueous solution for treating materials, such as wood, metal, masonry, brick, and composition board, which have been covered with lead based paint, to remove the paint therefrom. Briefly stated, the solution comprises a solvent that does not dissolve the paint and is compatible with water; a film former for retarding evaporation; a viscosity builder to prevent slumping during application of the solution to vertical and overhead horizontal surfaces; and an alkaline compound for reacting with pigment containing portions of the paint to loosen any crusted lead compounds, or other pigments, present on the surface thereof. Such crusted lead compounds oftentimes remain on the surface of aged paint following erosion of the original vehicle by oxidation and weathering.

In addition, the invention provides a method for safely and economically removing lead based paint covering a substrate, comprising the steps of:

(a) applying to the substrate an aqueous solution as defined hereinabove;

(b) allowing the applied solution to dry, and thereby maximize utilization of solvent activity available; and (c) rewetting the covering with water to coagulate substantially the entire resin content of the paint and remove it from said substrate.

Advantageously, the solution penetrates the deposited paint, which coagulates and separates from the substrate. Costly stripping procedures are eliminated. Substrates from which lead based paint has been removed in accordance with the invention do not require neutralization prior to repainting. A safe and effective treatment of materials covered with lead based paint is thereby carried out in an economical, cost effective manner.

DESCRIPTION OF THE PREFERRED EMBODIMENTS

The present invention provides a method for safely and economically removing lead-based paint from a substrate. Generally stated, the method comprises the steps of: (a) applying to the paint covered substrate an aqueous solution consisting essentially of (1) a low volatile, water compatible solvent that does not dissolve the paint, (2) a thermoplastic resin for film formation to retard evaporation, (3) a viscosity builder composed of plastic clay to increase viscosity, and (4) an alkaline compound to react with crusted pigments, which are oftentimes present on the surface of aged and weathered painted material; (b) allowing the solution to dry to complete the reaction and thereby maximize utilization of solvent activity available and (c) rewetting the resultant structure with water to coagulate substantially the entire resin content of the structure, and to soften and facilitate its removal from the substrate for eventual disposal.

It has been discovered that problems heretofore encountered with solvents conventionally used in paint removers are overcome by use of a low volatile, relatively safe solvent, together with additional ingredients, as described hereinafter. One such solvent is known to be a coalescent or solvent in acrylic latex paint, but is not known to be a solvent for the vehicles used in oil-based paints. That solvent is ethylene glycol monobutyl ether (butyl cellosolve).

In laboratory experiments in which a wood substrate containing lead paint was placed face up in a horizontal plane, it was observed that, unexpectedly, a puddle of the selected solvent was slowly absorbed. Upon repeated applications of the solvent over a period of several hours, the layers of paint, surprisingly, began to blister and permanently separate from the substrate. However, at no time did the paint itself appear to be dissolving, or become tacky. It has further been discovered that use of this solvent alone is impractical, since sufficient quantities of it must remain at the "scene of action"long enough to perform its function. Also, since most of the applied paint is found on materials in the vertical plane and overhead, it would be difficult to maintain sufficient quantities of the solvent on the paint covered substrate to readily separate the paint therefrom unless the viscosity thereof is increased substantially. Such an increase in viscosity is provided by (1) a rapid film former, which traps and delays evaporation of the solvent and (2) a viscosity builder, which minimizes slumping or running of the solution off the paint covered surface of the substrate.

The film former can be an acrylic resin polymer emulsion introduced in small quantities into the solvent. Various ratios of resin to solvent can be used. Generally, as the resin content increases, so does the desirable properties of film formation and increased 5 viscosity. It has been found that with increased viscosity there was also an increase in "stringiness" that makes it difficult to apply the solution to a painted surface with brush or sprayer. To prevent having to compromise the ratio of resin to solvent, an additional increase in viscosity, without an increase in "stringiness", is needed.

That further increase in viscosity is provided by a clay containing a substantial amount of montmorrillonite mineral. Such clay is also known as Wyoming bentonite, the principal mineral content of which is expressed by the formula $Al_2O_3 \cdot 4SiO_2 \cdot H_2O$. This clay is generally used where a plastic clay is needed, or to increase viscosity in emulsions. The latter is achieved by the swelling action upon absorption of water. Wyoming bentonite is an economical viscosity builder, since the majority content thereof is a colloidal clay. In addition, it dries into a pseudo film which fortifies the film developed by the acrylic resin polymer. Although formulations comprised strictly of the solvent, resin, and clay have physical properties for practical application and chemical properties for removal of lead paint manufactured in 1973 (but applied in 1993) to wood, metal and masonry substrates, it is not completely effective on aged and exposed paint that has been applied from 5–30 years ago.

Examination of substrates that have been painted with lead paint at least 15 years ago, and have been exposed to the attrition of weather reveals the erosion of substantial content of the original vehicle (binder). This leaves the surface layers of the paint with a high content of crusted pigment material consisting of lead and other compounds containing chromates, carbonates, oxides, and hydroxides. To effect removal of paint under these conditions, it is necessary to elevate the pH of the solution with dilute sodium hydroxide solution.

$Na^{(+)}$ and $OH^{(-)}$ ions greatly influence the viscosity of clays, especially bentonite, by controlling flocculation and defloculation. The ranges of ingredients of the aqueous solution were arrived at by investigating many formulations in which the content of the solvent (butyl cellosolve) and acrylic resin emulsion remained constant, and the content of the bentonite and sodium hydroxide solution were varied.

The following examples are presented to provide a more complete understanding of the invention. The specific techniques, conditions, materials and reported data set forth to illustrate the principles and practice of the invention are exemplary and should not be construed as limiting the scope of the invention.

EXAMPLE I

A formulation was prepared which contained the following ingredients:

220.00 Fl. oz. ethylene glycol monobutyl ether (butyl cellosolve);

43.30 Fl. oz. acrylic emulsion (Rohm & Haas Co. Rhoplex AC 630);

70.00 Fl. oz. 10% sodium hydroxide solution; and 4.63 lb. bentonite (Wyoming Big Horn 325 mesh).

The ingredients of the formulation were introduced in the sequence listed above and thoroughly mixed.

After mixing, the formulation was applied by brush to a steel substrate that had been painted with 8 coats of lead based paint. The lead based paint had been manufactured in 1973, and had the following composition:

| | | |
|---|---|---|
| Pigment by weight | | 29% |
| Lead Chromate | 29% | |
| Vehicle by weight | | 71% |
| Soya Alkyd Resin | 24% | |
| Tall Oil Alkyd Resin | 5% | |
| Mineral Spirits | 37% | |
| Naphtha | 3% | |
| Additives | 2% | |
| | 100% | 100% |

Prior to applying the paint removal formulation, the painted substrate was thoroughly air-dried and then baked for 2 hours at 180° F.

The amount of remover for a particular painted substrate will vary, depending upon the thickness of the paint and the condition thereof on the substrate. In the test conducted herein, the removal formulation was applied until slumping commenced when the test sample was placed in a vertical plane. After about 3 hours, the combination of remover and paint began to blister and separate from the substrate. At this point, the entire paint structure could be readily removed. To maximize efficiency of removal and disposal, the sample was allowed to dry for 12 hours. After drying, all activity of the remover had been utilized, and the material appointed for removal was no longer tacky.

Unlike solvent-based removers which, upon drying, form a combination film that can only be dissolved with solvents, the product of my invention forms a film that, upon drying, can be reversed with plain water. This is so because the influential ingredient in the film forming is the bentonite which, being hygroscopic, forms a completely reversible film. Accordingly, removal of the dried, separated paint from the substrate was readily accomplished by application of water, using a sprayer, until the structure softened. The application of the water performed two functions. First, it reactivated the dried structure, causing it to again separate from the substrate. Secondly, since the original resin emulsion used in the formulation had been broken by the drying, the re-introduction of plain water caused the resin polymer to coagulate. This coagulation feature is highly desirable, particularly at this point of the process, because it eliminates tackiness and facilitates the removal of the composite paint structure for subsequent disposal.

EXAMPLE II

The formulation of Example I was applied to a soft wood substrate that had been painted with the same paint, the same number of coats, and dried in the same manner as the metal substrate described in Example I.

Unlike the metal substrate, the test on the wood produced very little blistering of the paint. It was concluded that, after passing through the paint, a liquid composed of the residual solvent and water was absorbed by the wood. In the case of the metal substrate, this liquid apparently pocketed, and lifted the paint on its return to surface evaporation. Under these conditions, the paint did not separate as easily from the porous wood as it did from the metal, but the removal was very effective after following the procedure described in Example I.

EXAMPLE III

A field test was made on cypress wood windows that had been painted with many coats of lead paint over a 50 year period, and presented severely weathered surface layers. The formulation and procedure described in Example I were employed in bright sunlight at a temperature ranging from 95° to 100° F. Due to the low volatility and effective film formation, the applied remover required over 4 hours to dry. After drying and rewetting with water, the paint was removed with a single application of remover. During the same time frame and at the same location over 15 different commercial solvent-based removers were tried on the substrates described in this Example, and in Examples IV and V, described hereinafter, and were found to be ineffective. One reason for ineffectiveness of the commercial solvent-based removers was the high volatility thereof. This caused the rapid evaporation of ingredients and decreased activity of the products upon application to the hot substrates. In some cases, the removers would soften only one layer of paint at a time for removal. In each case, the procedure had to be repeated many times to reach the bare substrates. It was apparent that practice of this method using commercial removers would entail high material and labor costs.

EXAMPLE IV

A field test was carried out on metal gutters. The location of the test, the formulation and procedure employed, and the time frame for removal of the paint were the same as those recited in Example III. In this case, there was blistering of the paint that made its removal easier than from the wood windows.

EXAMPLE V

A field test was carried out on a cement block wall. The location of the test, the formulation and procedure employed, and the time frame for removal of the paint were the same as those recited in Example III. After removing the bulk of the separated paint, a wire brush was used to complete the stripping of the paint from the indentations and pores of the substrate.

Having thus described the invention in rather full detail, it will be understood that such detail need not be strictly adhered to, but that further changes may suggest themselves to one having ordinary skill in the art, all falling within the scope of the invention as defined by the subjoined claims.

What is claimed is:

1. An aqueous solution for the removal of oil-based paints, including those containing lead compounds, from a substrate, comprising:

a) a solvent that does not dissolve said paint, and is compatible with water, said solvent being ethylene glycol monobutyl ether present in an amount of 50.6 percent by weight;

b) a film former for retarding evaporation, said film former being a thermoplastic resin comprising an all-acrylic polymer or copolymer, in emulsion form having 50 percent solids, said emulsion being present in an amount of 11.6 percent by weight;

c) a viscosity builder to fortify said solution and prevent slumping thereof during application to vertical and overhead horizontal surfaces, said viscosity builder being a plastic clay composed of bentonite and being present in an amount of 18.1 percent by weight; and d) an alkaline compound for reacting with the pigment portion of said paint, said alkaline compound being a sodium hydroxide solution having 10 percent solids, said sodium hydroxide solution being present in an amount of 19.7 percent by weight, whereby said solution penetrates said paint and causes its separation from said substrate.

2. An aqueous solution as recited by claim 1, wherein said clay is a bentonite containing a substantial amount of montmorrillonite material.

* * * * *